United States Patent [19]

Chszaniecki et al.

[11] 4,399,719
[45] Aug. 23, 1983

[54] TWIN SCREW EXTRUDER WITH POWER BRANCHING GEARING

[75] Inventors: Siegfried Chszaniecki; Wilhelm Brand, both of Hanover, Fed. Rep. of Germany

[73] Assignee: Hermann Berstorff Maschinenbau GmbH, Hanover, Fed. Rep. of Germany

[21] Appl. No.: 241,518

[22] Filed: Mar. 9, 1981

[30] Foreign Application Priority Data

Mar. 12, 1980 [DE] Fed. Rep. of Germany ....... 3009398

[51] Int. Cl.³ .......................... F16H 57/00; F16H 1/20
[52] U.S. Cl. ......................................... 74/410; 74/411; 74/421 R
[58] Field of Search ............. 74/410, 411, 414, 665 G, 74/665 GA, 409, 665 N, 421 R, 331, 406

[56] References Cited

U.S. PATENT DOCUMENTS

| | | | |
|---|---|---|---|
| 1,728,279 | 9/1929 | Ramsey | 74/421.8 |
| 2,737,056 | 9/1953 | Baumgartner | 74/409 |
| 2,943,507 | 7/1960 | Bacuman | 74/421 |
| 3,657,940 | 4/1972 | Wagner | 74/397 |
| 3,678,775 | 7/1972 | Danielsson | 74/410 |
| 3,824,875 | 7/1974 | Willert et al. | 74/665 GA |
| 3,916,712 | 11/1975 | Kelbel et al. | 74/410 |
| 4,261,225 | 4/1981 | Zahradnik | 74/665 GA |
| 4,297,907 | 11/1981 | Bossler, Jr. et al. | 74/411 |
| 4,315,440 | 2/1982 | Chszaniecki | 74/665 G |

Primary Examiner—Lawrence J. Staab
Assistant Examiner—Michael D. Bednarek
Attorney, Agent, or Firm—Schwartz, Jeffery, Schwaab, Mack, Blumenthal & Koch

[57] ABSTRACT

Each screw shaft of a twin screw extruder with power branching gearing is driven by a gear train comprising a driven pinion, a first pair of intermediate gears meshing with the driven pinion from opposite sides, a second pair of intermediate gears each meshed with a respective one of the first pair of intermediate gears and a drive pinion meshed on its opposite sides with the second pair of intermediate gears and coupled to a power shaft. The first and second pairs of intermediate gears are capable only of rotation in a gear casing in which they are mounted but the drive pinion and the driven pinion are capable of radial movement in the casing. As shown the driven pinion has an axial extension with curved teeth engaged in one end of a coupling sleeve with internal curved teeth and a portion of the shaft has curved teeth engaged with the curved teeth in the other end of the sleeve, the shaft being mounted in bearings.

2 Claims, 3 Drawing Figures

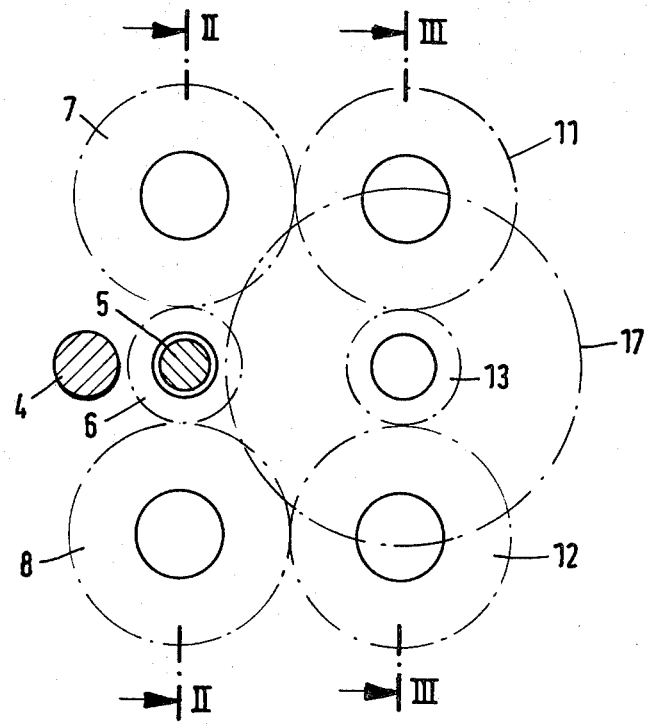
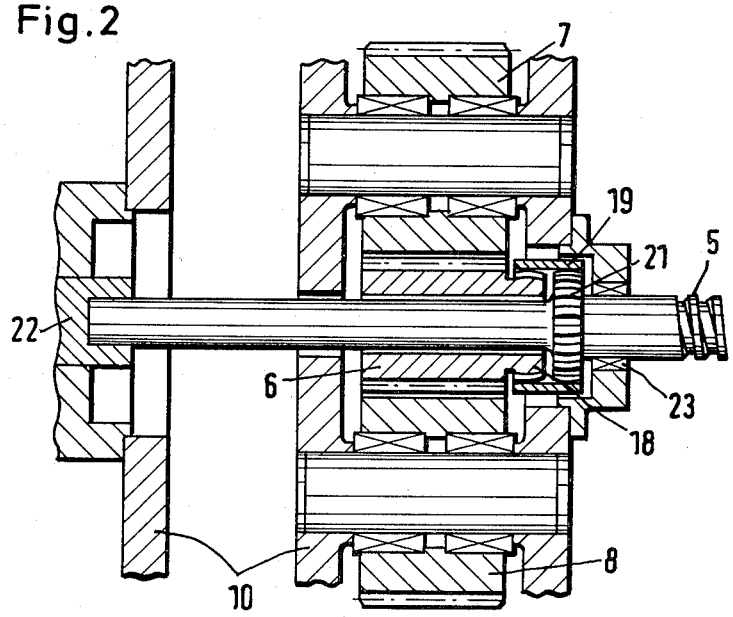

TWIN SCREW EXTRUDER WITH POWER BRANCHING GEARING

The invention relates to twin screw extruders and particularly to drive means for the twin screws thereof.

The distance between the axes of the screw shafts of a twin screw extruder limits the diameters of driven pinions on the shafts and forming part of gearing for driving the screws. These driven pinions cannot be just any amount larger than the screw shafts themselves. Even if the driven pinions of the two drive shafts for the screws are staggered axially with respect to one another, with the high torques required nowadays it is no simple matter to obtain a long enough life for the gearing and small loads on radial bearings of the drive shafts for the screws. Many different proposals have already been made regarding torque transmitting arrangements and gear constructions to avoid the difficulty.

The principle of branching the power for driving the driven pinion of the screw drive shafts has found the greatest acceptance. In twin screw extruder gearings it has been proposed to divide the driving torque by means of an appropriate gearing construction, on account of the limited space for driving a screw shaft. The component torques are transmitted from two opposed sides to the driven shaft of the bearing, which is also the screw drive shaft, at the same time taking the load off the radial bearings of the screw drive shaft.

With this power branching then, preferably two engagements between teeth on each driven pinion are used for transmitting torque. It has been found, however, that the two engagements at the pinion in question cannot be uniform, since the distances between the axes of the intermediate gears and driven pinions and the shapes of the teeth on the gears vary due to manufacturing tolerances. Proposals have therefore already been made with a view to transmitting the torque components uniformly to the driven pinion. Such proposals comprise providing for self adjustment in the gearing; this is said to allow for uniform clearance between engaging teeth and thus to compensate for inaccuracies in manufacture.

In one prior proposal all the gear wheels required for actually driving a screw drive shaft, and for compensating for play between teeth and manufacturing inaccuracies, are disposed in one plane. The driven pinion of the screw drive shaft mounted in the gear casing is engaged by two intermediate gears of equal size, each intermediate gear engaging a respective one of two further intermediate gears of equal size. The two further intermediate gears in turn engage from two opposing sides a drive pinion imparting the driving torque, the drive pinion being of the same size as the driven pinion of the screw drive shaft. The drive shaft carrying the drive pinion is also mounted in the gear casing. The four intermediate gears of equal size are mounted in a pivotable frame, which can move freely only in the direction of a straight line joining the axis of the drive pinion to the axis of the driven pinion.

Automatic setting of equal torque components at the driven and drive pinion is not possible with gearing of this kind, since a compensating movement of the intermediate gears would have to be normal to the plane of the pinions. The ability to move only parallel with the straight line joining the pinions results in no adjustment of the play between engaging teeth. Heavy loads on the radial bearings of the screw drive shafts therefore continue. The transmission of component torques to the driven pinion in question is not completely compensated for. The uniform power branching required is not possible with this gearing.

The invention has among its objects to provide a gearing for driving a screw drive shaft of a twin screw extruder which will allow for automatic adjustment of the gearing so that uniform power branching can be obtained, by always having uniform engagements between teeth on the drive pinion and the driven pinion.

According to the invention there is provided a twin screw extruder with power branching gearing for driving each of the drive shafts, for the twin screws, wherein the gearing has four intermediate gears, a first pair of the intermediate gears are of the same size and are in engagement, opposite one another, with a driven pinion of the respective screw drive shaft, and a second pair of the intermediate gears are also of equal size and are in engagement, opposite one another, with a drive pinion of a drive shaft imparting the torque, a first gear of the first pair of intermediate gears is engaged with a first gear of a second pair of intermediate gears on one side of a line joining the axis of the driven pinion to the axis of the drive pinion and a second gear of the first pair of intermediate gears is in engagement with a second gear of the second pair of intermediate gears on an opposite side of said line, the drive pinion and the driven pinion are radially movably disposed in a gear casing, and the four intermediate gears are capable only of rotational movement in the gear casing.

The radially adjustable drive and driven pinions enable a uniform tooth engagement to be set between the pinions and the pairs of associated intermediate gears engaging on opposite sides. The division of drive and driven torque into two equal torque components at the drive and driven pinions is made possible by the radially movably arrangement of the pinions. The driven and drive pinions always adjust positively to uniform power branching relative to the intermediate gears. An equal tooth pressure is obtained for both points of engagement on the driven pinion and for both on the drive pinion, independently of the manufacturing tolerances of the gears and the distances between axes. The radial bearing of the screw drive shaft remains free of any appreciable radial loads.

Preferably the drive pinion has a coaxial extension with curved teeth, engaged in a coupling sleeve with internal teeth, the other end of the coupling sleeve engages over an end of a shaft with curved teeth, and the driven pinion similarly has a coaxial extension with curved teeth, engaged in a further coupling sleeve with internal teeth, the other end of the further coupling sleeve engaging over and meshing with a portion of the screw drive shaft provided with curved teeth.

Such a power branching gearing can enable the strong drive forces which are now required in twin screw extruders to be transmitted without any appreciable bending of the screw drive shaft and consequent premature damage to the radial bearings. In every loaded condition of the screw shaft the strong torque to be transmitted is divided into two equal components and transmitted by uniform power branching. The cost of bearings for the screw drive shaft can be minimised, since the shaft can no longer be bent by unilateral application of force.

The invention is diagrammatically illustrated by way of example in the accompanying drawings, in which:

FIG. 1 is a diagrammatic side elevation of gearing for driving one of the screw drive shafts of a twin extruder with power branching gearing according to the invention;

FIG. 2 is a view in cross-section taken on line II—II of FIG. 1; and

Figure 3:
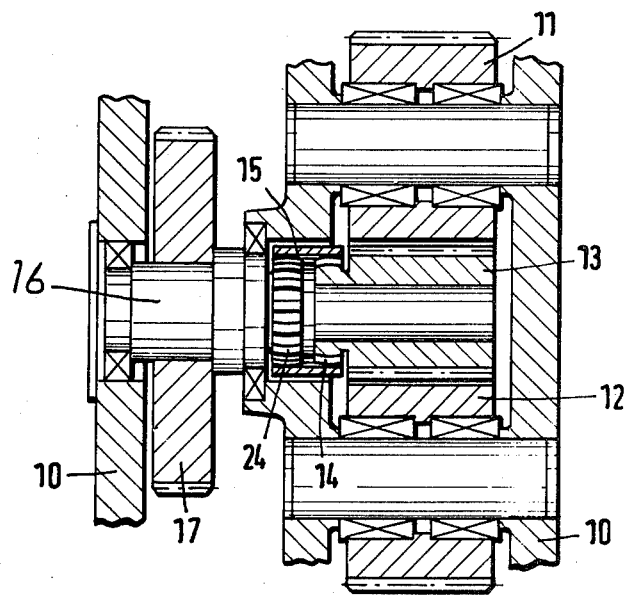
FIG. 3 is a view in cross-section taken on line III—III of FIG. 1.

Referring to the drawings, closely spaced, parallel screw drive shafts 4 and 5 of a twin screw extruder are shown. Only gearing for driving the screw drive shaft 5 is shown. The shaft 5 is the driven shaft of the gearing and has a driven pinion 6. The driven pinion 6 is in engagement with a first pair of intermediate gears 7 and 8, mounted opposite one another in a gear casing 10. Each gear 7 and 8 meshes with an adjacent respective one of a second pair of intermediate gears 11 and 12 respectively which are of the same size. A drive pinion 13, which imparts the driving torque is in engagement on two sides with the opposed second pair of intermediate gears 11 and 12. The gears 11 and 12 are similarly mounted in the gear casing 10. The drive pinion 13 is coupled, via a coaxial extension 14 with curved teeth and via a coupling sleeve 15 with internal teeth, to an axially aligned operating shaft 16, so that it can move radially. The shaft 16 has an end portion 24 with curved teeth engaged with the teeth of the sleeve 15 and a drive gear 17 secured thereon, whereby driving torque can be imparted to the gearing.

The driven pinion 6 of the gearing is also arranged for movement in a radial direction. It similarly carries a coaxial extension 18 with curved teeth, over which a coupling sleeve 19 with internal teeth engages. The extension 18 is again coupled to a portion 21 of the screw drive shaft 5 with curved teeth, so that it can move in a radial direction. The shaft 5 is guided through the gear casing 10 with its end supported in an axial thrust bearing 22. At the casing side the shaft 5 is supported in a radial bearing 23.

Torque is imparted to the gearing illustrated by the drive gear 17. When the gearing is loaded, the radially movable drive pinion 13 operates to divide the driving torque into two equal torque components. The radial mobility of the drive pinion 13 is provided by means of the curved tooth coupling 14, 15, 24. The torque components are transmitted by the second pair of intermediate gears 11 and 12 to the first pair of intermediate gears 7 and 8, and thence on two sides to the also radially movable driven pinion 6 of the screw drive shaft 5. If the teeth engage unevenly the drive pinion 13 and driven pinion 6 can move radially into a position of uniform power transmission at the two tooth engagement locations on each pinion 13 and 6.

The uniform branching of power enables a strong torque to be transmitted to a screw drive shaft parallel with and closely adjacent another such shaft, and enables the technical outlay on the gearing to be minimised.

What is claimed is:

1. An extruder with twin screws and associated output drive shafts, and power branching gearing for driving said output drive shafts, comprising:
   (a) a gear casing;
   (b) a driven pinion drivably connected to one of said output drive shafts;
   (c) a first pair of intermedate gears of the same size and disposed opposite one another in engagement with said driven pinion, and means for mounting said first pair of intermediate gears in said gear casing such that said intermediate gears are capable only of rotational movement in said casing;
   (d) a drive pinion drivably connected to an operating shaft for imparting torque to said gearing;
   (e) a second pair of intermediate gears of the same size and disposed opposite one another in engagement with said drive pinion, and means for mounting said second pair of intermediate gears in said gear casing such that said gears are capable only of rotational movement in said casing;
   (f) a first gear of said first pair of intermediate gears engaging a first gear of said second pair of intermediate gears on one side of a line through the axes of said drive and driven pinions;
   (g) a second gear of said first pair of intermediate gears engaging a second gear of said second pair of intermediate gears on the opposite side of said line, and
   (h) means for mounting said drive pinion and said driven pinion for radial movement, relative to the axes of said pinions, in said gear casing, thereby providing uniform power transmission to said pinions and said output drive shafts.

2. The extruder claimed in claim 1, wherein said drive pinion has a coaxial extension with curved teeth, said coaxial extension is engaged in one end of a coupling sleeve with internal teeth, the other end of said coupling sleeve engages over an end of said operating shaft which has curved teeth thereon, and said driven pinion similarly has a coaxial extension with curved teeth, engaged in one end of a further coupling sleeve with internal teeth, the other end of said further coupling sleeve engaging over and meshing with a portion of the associated output drive shaft, the latter being formed with curved teeth thereon.

* * * * *